United States Patent [19]

Sekine

[11] Patent Number: 5,898,425
[45] Date of Patent: *Apr. 27, 1999

[54] COMPUTER SYSTEM WITH KEYBOARD AND POINTING DEVICE INTERFACE FOR MANAGING DEVICE INPUT CODES

[75] Inventor: Shigeru Sekine, Tokyo, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/608,196

[22] Filed: Feb. 28, 1996

[30] Foreign Application Priority Data

Mar. 3, 1995 [JP] Japan ................... 7-044500

[51] Int. Cl.$^6$ .............. G09G 5/00; H02B 1/20; G06F 3/00
[52] U.S. Cl. ............. 345/168; 361/827; 364/709.12
[58] Field of Search .............. 395/893, 821–894; 345/156–172, 160, 157; 341/22–29; 463/37, 38; 364/709.12; 340/825.31; 361/827, 828

[56] References Cited

U.S. PATENT DOCUMENTS

| | | | |
|---|---|---|---|
| 5,278,958 | 1/1994 | Dewa | 395/836 |
| 5,341,316 | 8/1994 | Nishigaki | 364/709.12 |
| 5,432,530 | 7/1995 | Arita et al. | 345/159 |
| 5,459,462 | 10/1995 | Venkidu et al. | 341/22 |
| 5,465,083 | 11/1995 | Okamoto | 340/825.31 |
| 5,473,347 | 12/1995 | Collas et al. | 345/169 |
| 5,574,891 | 11/1996 | Hsu et al. | 395/500 |
| 5,613,135 | 3/1997 | Sakai et al. | 395/882 |
| 5,673,066 | 9/1997 | Toda et al. | 345/157 |

*Primary Examiner*—Jeffrey Brier
*Assistant Examiner*—David L Lewis
*Attorney, Agent, or Firm*—Oblon, Spivak, McClelland, Maier & Neustadt, P.C.

[57] ABSTRACT

A connector mounted on a system board has terminals the number of which corresponds to the total sum of key matrix control signal lines and pointing stick control signal lines. The key matrix control signal lines and pointing stick control signal lines are connected together to the connector. Both a keyboard interface and a pointing stick interface can thus be achieved by the single connector, resulting in improvement in mounting efficiency, decrease in cost and simplification in assembly process.

1 Claim, 6 Drawing Sheets

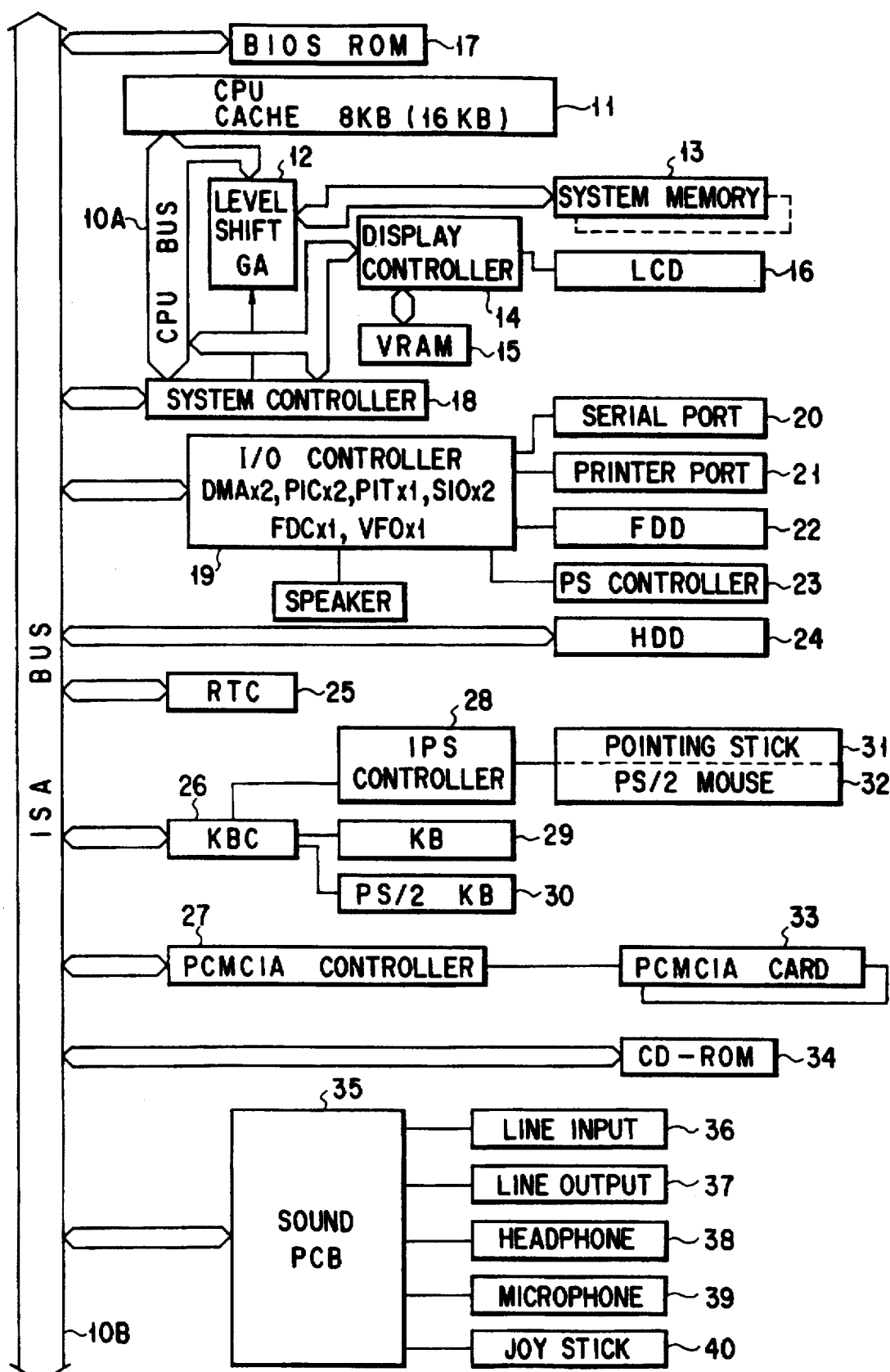
F I G. 1

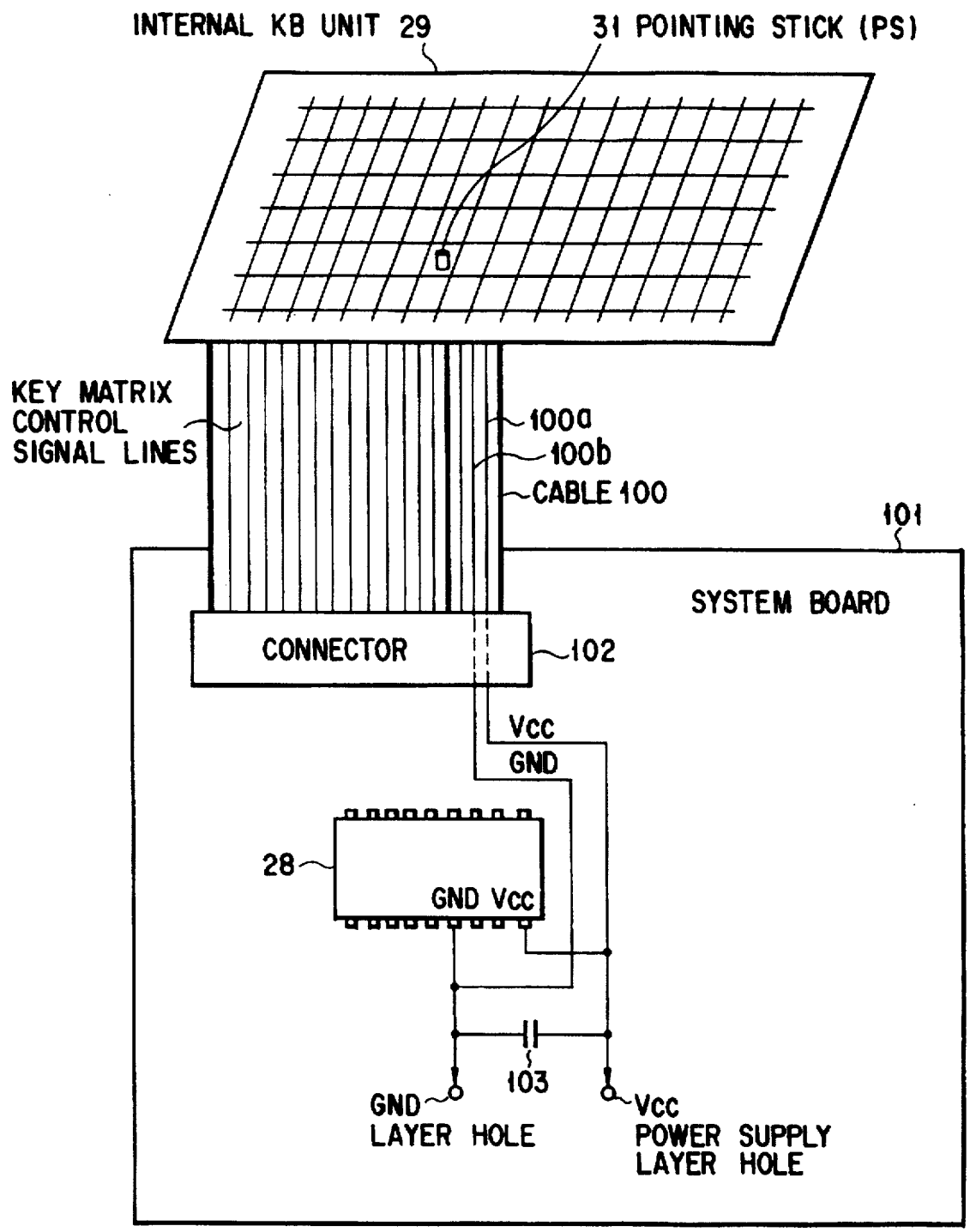
F I G. 5

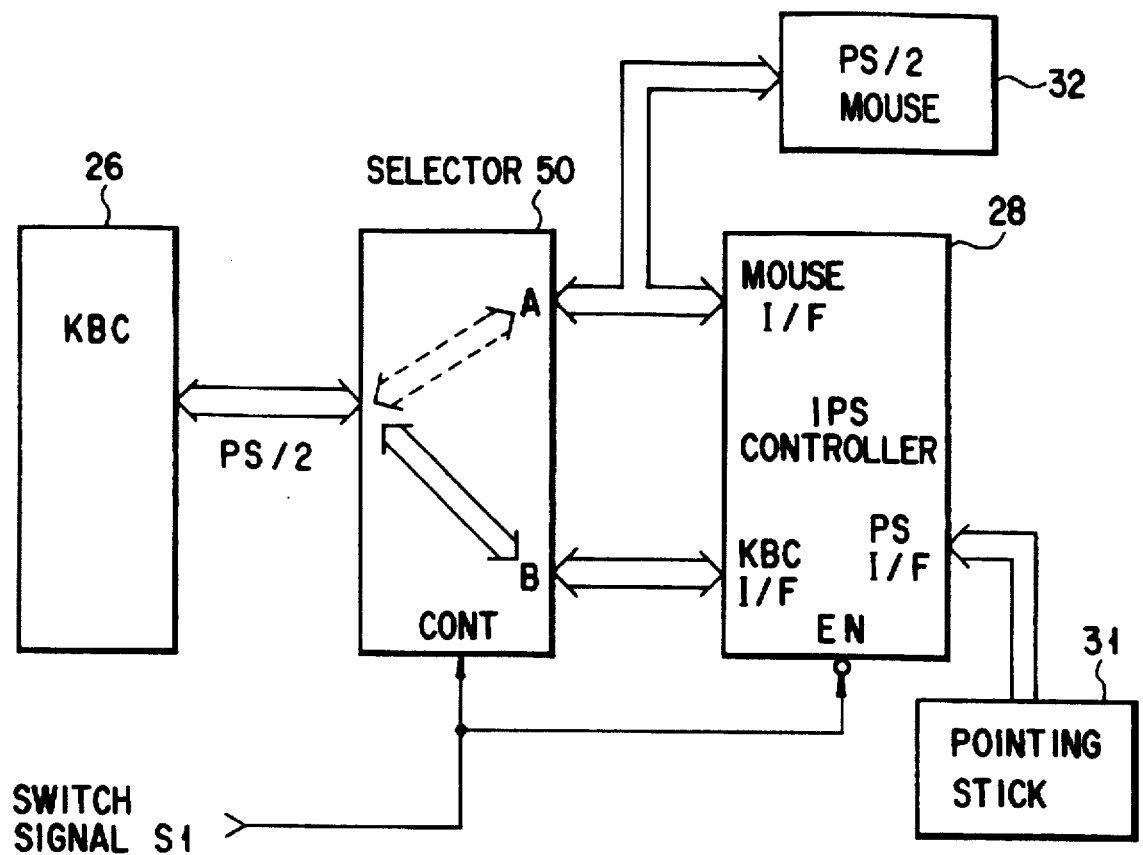
F I G. 6
| SWITCH SIGNAL S1 | SELECTOR PORT | IPS CONTROLLER |
|---|---|---|
| "0" | B | ENABLE |
| "1" | A | DISABLE |
F I G. 7

| SWITCH SIGNAL S2 | SELECTOR PORT | KB/MOUSE |
|---|---|---|
| "0" | BB | PS/2 MOUSE |
| "1" | AA | PS/2 KB |

5,898,425

COMPUTER SYSTEM WITH KEYBOARD AND POINTING DEVICE INTERFACE FOR MANAGING DEVICE INPUT CODES

BACKGROUND OF THE INVENTION

1. Field of the Invention

The present invention relates to a computer with a keyboard unit including a pointing device.

2. Description of the Related Art

Various types of portable personal computer, such as a notebook computer and a laptop computer, which can be carried easily and operated by a battery, have recently been developed. These personal computers employ built-in pointing device such a track ball, a pointing stick, and a touch pad.

Since the pointing stick can be arranged in a keyboard unit, the area of the pointing device occupied in the computer can be reduced greatly, as compared with the case of a personal computer equipped with a track ball and a touch pad. The pointing stick is therefore effective in serving as a pointing device of small-sized personal computers, especially A4-sized and B5-sized computers.

However, in a conventional personal computer, though a pointing stick is arranged in a keyboard, the pointing stick and keyboard unit are connected to two separate connectors mounted on a system board through cables, thus causing a problem wherein the mounting efficiency is lowered, the cost is increased, and the assembly process is complicated.

Since a power supply for supplying power to the built-in pointing device, differs from that of a pointing device control IC mounted on the system board, there occurs a problem in which the control IC erroneously detects a signal supplied from the built-in pointing device.

In other words, since a number of electric components are mounted on the system board, their operation states may cause noise in the power supply of the control IC and thus the detection level of the control IC is likely to vary. If, in this case, there occur variations in relationship between the signal level of the built-in pointing device and the detection level of the control IC, the control IC erroneously detects the signal from the built-in pointing device, resulting in a drawback wherein a cursor moves freely without operating the built-in pointing device and software malfunctions.

Conventionally, since the keyboard unit and pointing stick are connected to the two connectors, which are mounted on the system board, through the cables, respectively, the mounting efficiency is lowered accordingly. Since, furthermore, the power supply for supplying power to the built-in pointing device, differs from that of the built-in pointing device control IC mounted on the system board, the control IC is likely to erroneously detect a signal from the built-in pointing device when noise or the like occurs in the power supply.

In the conventional computer described above, a mouse interface of a keyboard controller is employed by the control IC. To use an external mouse, therefore, it should be connected to the mouse interface of the keyboard controller through the control IC; however, in this case, a usable mouse is limited to one type supported by the control IC.

SUMMARY OF THE INVENTION

An object of the present invention is to provide a computer capable of enhancing the mounting efficiency of a system board and the operating reliability of a built-in pointing device by improving an interface between the system board and built-in pointing device.

Another object of the present invention is to provide a computer capable of employing various types of external mouse by improving the connection between a keyboard controller and a control IC.

The present invention is featured in a computer comprising a keyboard unit provided with a pointing stick; key matrix control signal lines leading out of the keyboard unit and including scan signal lines and return signal lines for controlling a key matrix of the keyboard unit; pointing stick control signal lines leading out from the keyboard unit and connected to the pointing stick; and a connector mounted on a system board and having terminals whose number corresponds to a total sum of the key matrix control signal lines and the pointing stick control signal lines, the key matrix control signal lines and the pointing stick control signal lines being connected in common to the connector.

According to the above computer, since the key matrix control signal lines and pointing stick control signal lines are connected by the same connector, both a keyboard interface and a pointing stick interface can be achieved by the single connector, resulting in improvement in mounting efficiency, decrease in cost and simplification in assembly process.

The present invention is also featured in a computer including a built-in pointing device, wherein a power supply pin of an IC mounted on a system board and having a circuit for detecting a signal supplied from the built-in pointing device and a power supply line defined in a cable leading from the system board to the built-in pointing device are connected to a single power supply layer hole of the system board, and a ground pin mounted on the system board and a ground line defined in the cable are connected to a single ground layer hole of the system board.

According to the above computer, a power supply voltage applied to the built-in pointing device and that of the control IC for controlling the built-in pointing device are obtained from the same power supply layer hole, and the constant relationship in level between a signal from the built-in pointing device and a signal detected by the control IC can be maintained even though noise occurs on the power supply. It is thus possible to prevent a drawback wherein a cursor moves freely without operating the built-in pointing device and software malfunctions, from being caused.

Furthermore, the present invention is featured in a computer comprising: a built-in pointing device;

a keyboard controller for controlling a key-in operation; a control IC for controlling the built-in pointing device and a mouse connected to a predetermined connector, the control IC including a first interface connected to the built-in pointing device, a second interface connected to the connector, and a third interface connected to a mouse interface of the keyboard controller;

a selector provided between the keyboard controller and the third interface of the control IC, for connecting one of the connector and the third interface of the control IC to the mouse interface of the keyboard controller; and means for enabling/-disabling the control IC in accordance with switching of the selector in such a manner that the control IC is disabled when the connector is connected by the selector.

According to the above computer, if a connector connected to the external mouse is selected by the selector, the external mouse can be connected directly to the keyboard controller but not through the control IC. Various types of mouse can thus be used irrespective of the control IC. If a connector connected to the external mouse is selected by the selector, the control IC is disabled. Therefore, a drawback such as a collision between signals from the control IC and the keyboard controller, does not occur.

BRIEF DESCRIPTION OF THE DRAWINGS

FIG. 1 is a block diagram showing a system configuration of a portable personal computer according to one embodiment of the present invention;

FIG. 5 is a view showing a capacitor connected between a power supply common to the pointing stick and the IPS controller and a ground common thereto in the personal computer shown in FIG. 1;

FIG. 6 is a view explaining an interface between the keyboard controller and IPS controller in the personal computer shown in FIG. 1;

FIG. 7 is a view explaining an operation of a selector used in the connecting configuration shown in FIG. 6.

DETAILED DESCRIPTION OF THE PREFERRED EMBODIMENT

Figure 2:
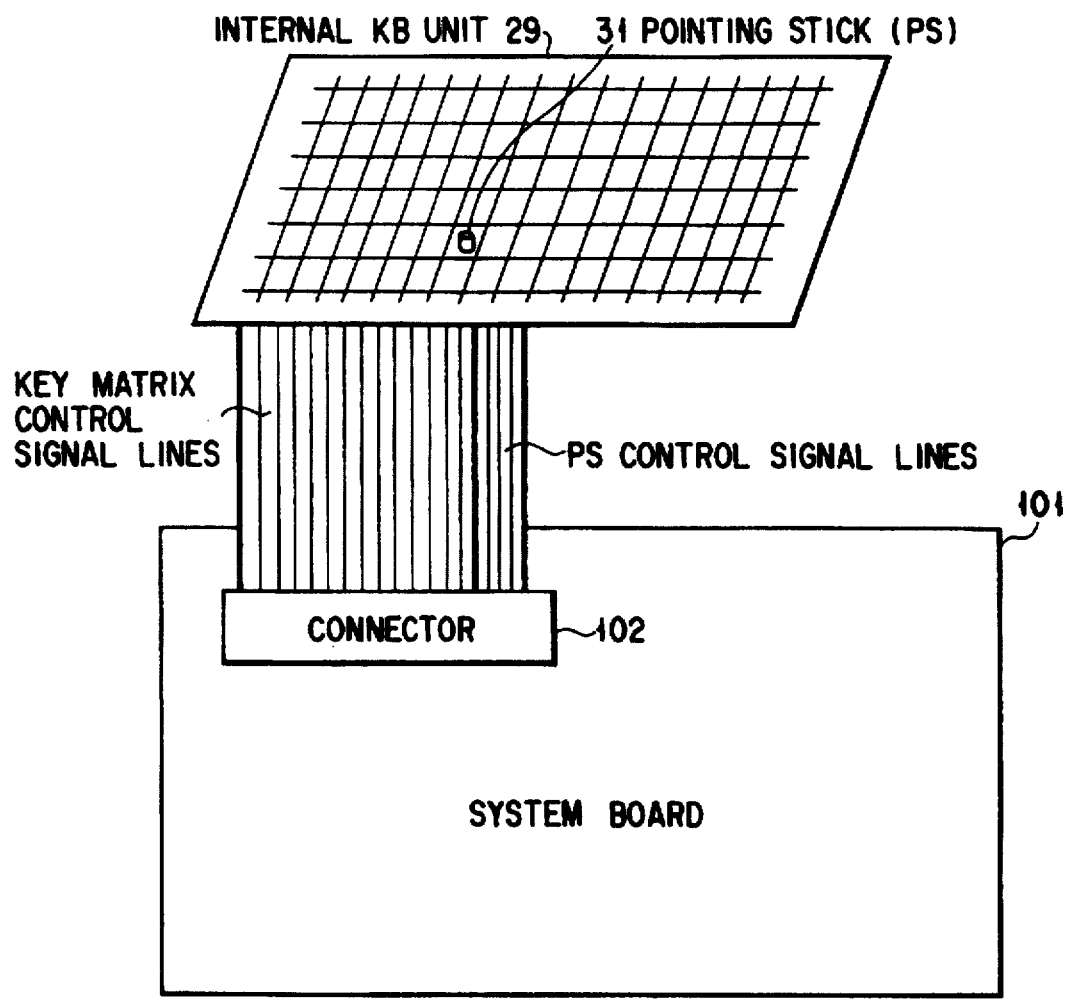
FIG. 2 is a view showing an interface between an internal keyboard unit with a pointing stick and a system board in the personal computer shown in FIG. 1.

An embodiment of the present invention will now be described with reference to the accompanying drawings. FIG. 1 shows a system configuration of a computer according to the embodiment of the present invention.

The computer is a system of a laptop type or a notebook type and, as shown in FIG. 1, includes a CPU local bus (processor bus) 10A, an ISA system bus 10B, a CPU 11, a level shifting gate array 12, a system memory 13, a display controller 14, a video memory (VRAM) 15, and a flat panel display 16 such as an LCD.

The CPU 11 is designed t o control the whole system and execute a target program stored in the system memory 13. The CPU 11 is one operable at 3V/5V, such as microprocessor SL Enhanced Intel 486 available from Intel, and a power supply voltage of 3.3 V is applied to the CPU 11 by a power supply controller 23 which will be described later. The CPU 11 incorporates a cache memory whose one-line data size is 32 bits×4. A 32-bit data bus, a 32-bit address bus, various status signal lines, and the like are defined in the local bus 10A of the CPU 11.

The system memory 13 stores an operating system, an application program to be executed, user's data produced by the application program, etc. As the operating system (OS), a system having a function of managing a hardware resource (interrupt level, DMA channel number, I/O address space, etc.) of an I/O device is used. The system memory 13 is constituted by a dynamic RAM operated at 5 V.

The level shifting gate array 12 is connected between the 32-bit data bus defined in the CPU local bus 10A and the system memory 13 to convert the voltage level of a data signal transferred between them from 3.3 V to 5 V or from 5 V to 3.3 V. The voltage level conversion of the data signal is performed by a buffer circuit in the level shifting gate array 12. In order to execute a CPU bus cycle and a read access cycle of the system memory 13 asynchronously with each other, the buffer circuit has a data latch function of latching data read out of the system memory 13.

The display controller 14 is designed to control the flat panel display 16 constituted by an STN monochrome panel, an STN color panel, a TFT color LCD panel or the like. The controller 14 receives display data from the CPU 11 via the CPU local bus 10A and writes it to the video memory (VRAM) 15.

A BIOS ROM 17, a system controller 18, and an I/O controller 19 are connected to the system bus 10B.

The BIOS ROM 17 is used to store a system BIOS (Basic I/O System) and constituted by a flash memory so as to enable programs to be rewritten. The system BIOS contains an IRT routine executed when power is on, a device driver for controlling various types of I/O device, a system management program, a setup program, etc.

The system controller 18 includes a bridge device connecting the CPU local bus 10A and system bus 10B and a memory control logic for controlling various types of memory in the system.

The I/O controller 19 controls an I/O device connected to a serial port 20, a printer/external FDD connected to an ECP (Extended Capability Port) 21 serving as a bidirectional parallel port, an internal FDD of 3.5 inches, etc.

The I/O controller 19 is constituted by a single LSI which includes two DMA controllers for direct access to the memories, two interrupt controllers (PIC: Programmable Interrupt Controller), one system timer (PIT: Programmable Interval Timer), two serial I/O controllers (SIO: Serial Input/Output Controller), and one floppy disk controller (FDC).

The I/O controller 19 also includes a group of I/O registers used for communications between a power supply controller (PSC) 23 and CPU 11 and a group of I/O registers for setting the environment of the parallel port 21.

Furthermore, an internal HDD 24, a real time clock (RTC) 25, a keyboard controller (KBC) 26, a PCMCIA controller 27, a CD-ROM 34 and a sound card 35 are connected to the system bus 10B.

The real time clock (RTC) 25 is a clock module having its own operating battery and includes a CMOS static RAM (referred to as a CMOS memory) to which a power supply voltage is normally applied from the battery. The CMOS memory is used, for example, to retain environment setting information indicative of the operation environment of the system.

The keyboard controller (KBC) 26, which is intended to control an internal keyboard 29 incorporated into the computer body, scans a key matrix of the internal keyboard 29, receives a signal corresponding to a depressed key, and converts it into a predetermined key code (scan code).

The keyboard controller 26 has a function of controlling an optionally connected external keyboard 30 and that of controlling a pointing stick 31 and a mouse 32 using a dedicated processor (IPS controller) 28. The pointing stick 31 is provided on a keyboard unit of the internal keyboard 29 such that they are integrally formed as one component (See FIG. 2). The IPS controller 28 is a pointing stick control IC including a circuit for detecting a signal sent from the pointing stick 31.

The interface between the pointing stick 31 and system board and that between the IPS controller 28 and keyboard controller 26 are the features of the present invention, and their specific configurations will be described later with reference to FIG. 2 et seq.

The PCMCIA controller 27 controls the access of an optionally mounted PC card 33 of JEIDA/PCMCIA. The sound card 25 includes a PCM sound source, a circuit for digitally processing a voice signal, and the like. A line input terminal 36, a line output terminal 37, a headphone terminal 38, a microphone terminal 39, and a joy stick terminal 40, are connected to the sound card.

FIG. 2 illustrates an interface between the internal keyboard unit 29 provided with the pointing stick 31 and a system board 101.

The system board 101 is a printed circuit board on which the CPU 11, memories, controllers, etc., as shown in FIG. 1, are formed, and includes a connector 102 interfacing with the internal keyboard unit 29, as shown in FIG. 2.

The connector 102 includes terminals the number of which corresponds to the total sum of key matrix control signal lines of the internal keyboard unit 29 and pointing stick control signal lines of the pointing stick 31.

A number of scan lines and return lines for controlling the key matrix of the internal keyboard unit 29, a power supply line for supplying power to the internal keyboard unit 29, a ground line, and the like are defined in the key matrix control signal lines. A signal line for receiving a signal from the pointing stick 31, a power supply line for supplying power to the pointing stick 31, a ground line, and the like are defined in the pointing stick control signal lines.

These key matrix control signal lines and pointing stick control signal lines are led out from the internal keyboard unit 29 via the same cable or different cables, and then connected to the connector 102.

Since, as described above, the key matrix control signal lines and pointing stick control signal lines are connected to the same connector 102, the keyboard interface and pointing stick interface can be achieved by the single connector. The devices can thus be mounted on the system board by adopting the integral structure wherein the pointing stick 31 is provided in the internal keyboard unit 29, thereby improving in mounting efficiency of the system board 101, decrease in cost, and simplification in assembly process.

Figure 3:
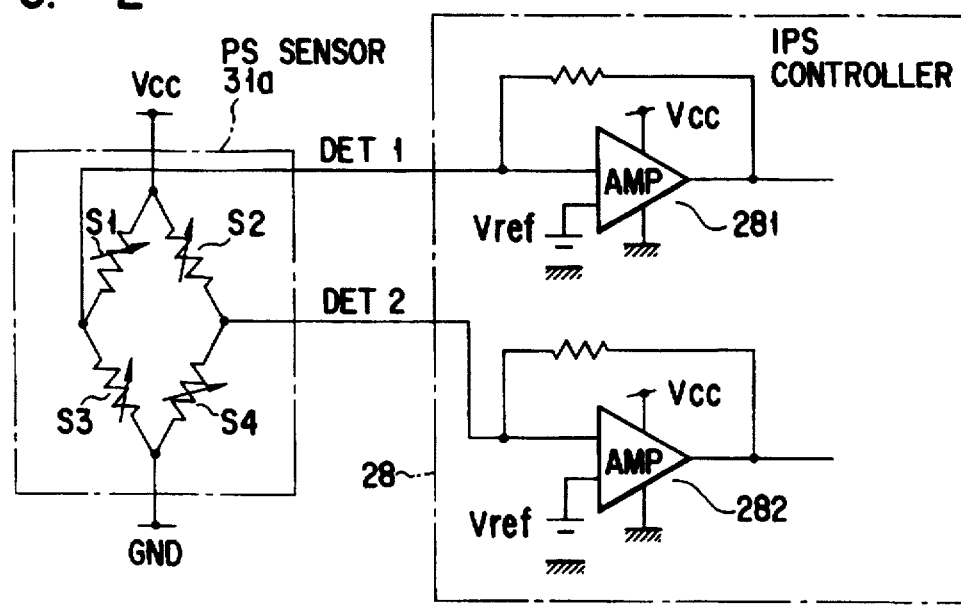
FIG. 3 is a block diagram showing a configuration of a sensor of the pointing stick and a detection circuit of an IPS controller in the personal computer shown in FIG. 1.

FIG. 3 shows a sensor 31a provided at the pointing stick 31 and a detection circuit of the IPS controller 28.

The sensor 31a of the pointing stick 31 is constituted by four strain sensors S1 to S4. These sensors S1 to S4 are arranged on the respective four sides of an action axis and bridge-connected to each other as shown in FIG. 3.

Two detection signals DET1 and DET2 output from the pointing stick 31 are supplied to two analog detection circuits 281 and 282 of the IPS controller 28, respectively, and an amount of movement of the pointing stick 31 is measured therein. The analog detection circuits 281 and 282 detect and amplify a difference between reference voltage Vref and detection signal DET1 and a difference between reference voltage Vref and detection signal DET2, respectively.

If noise occurs in the power supply of the IPS controller 28, the detection levels of the detection circuits 281 and 282 will vary. If, in this case, the power supply of the IPS controller 28 and that of the IPS controller 28, differ from each other, there occurs variations in the relationship between the voltage level of signals DET1 and DET2 from the pointing stick 31 and the detection level of detection circuits 281 and 282, with the result that the signals DET1 and DET2 are likely to be detected erroneously.

Figure 4:
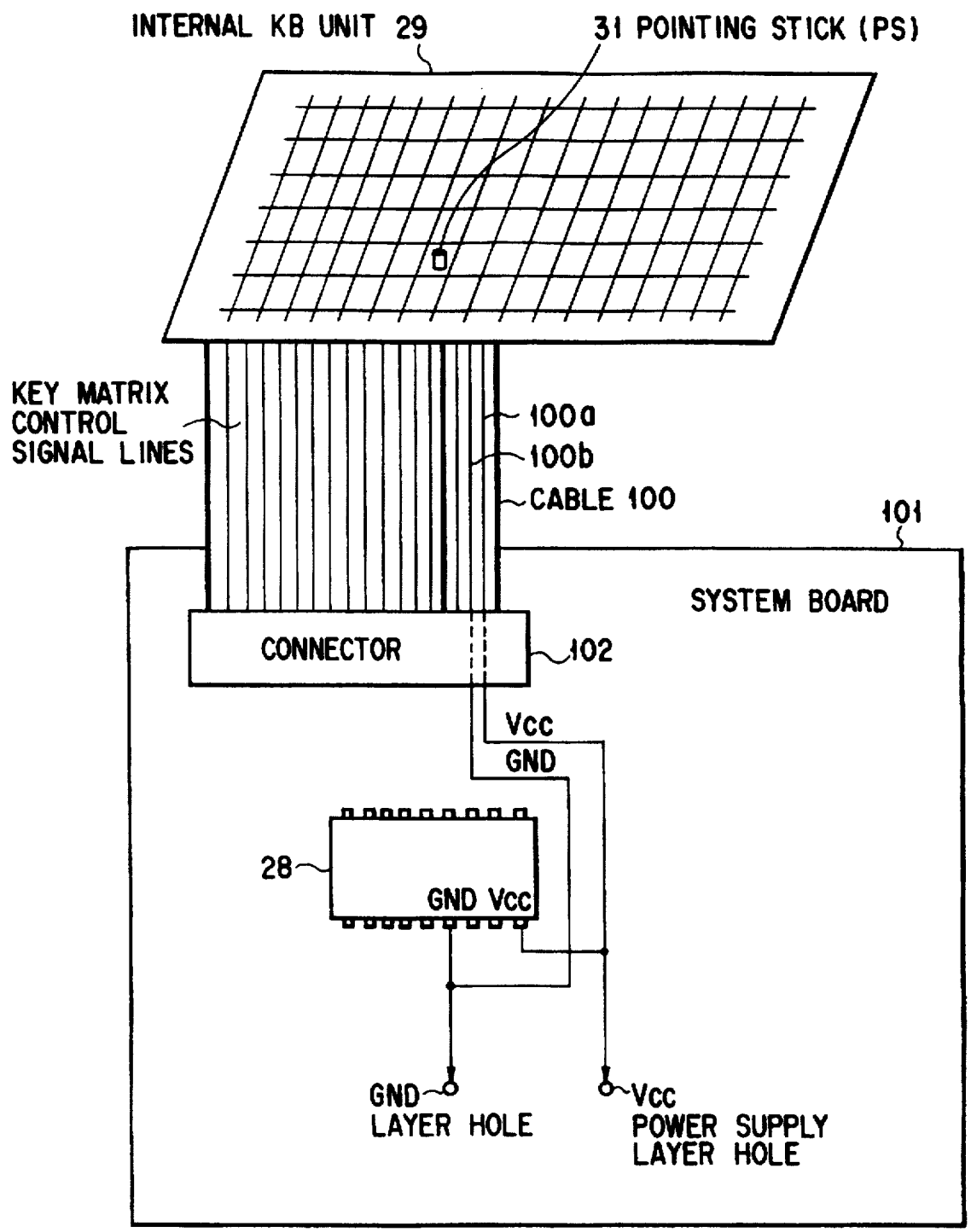
FIG. 4 is a view explaining the connecting position of the pointing stick and IPS controller in the personal computer shown in FIG. 1.

In this embodiment, as shown in FIG. 4, the cable 100 connecting the pointing stick 31 and the connector 102 has a power supply line 100a and a ground line 100b. The power supply VCC applied to the built-in pointing device 31 through the connector 102 and the power supply line 100a, and the power supply VCC pin of the PS controller 28 are connected to the same VCC power supply layer hole on the system board. The ground applied to the built-in pointing device 31 through the connector 102 are connected to the same ground layer hole on the system board.

If, as described above, the power supply voltage applied to the pointing stick 31 and that of the IPS controller 28 for controlling the pointing stick 31 are obtained from the same power supply layer hole, the constant relationship in level between the signals DET1 and DET2 and those detected by the detection circuits 281 and 282 can be maintained without causing any noise in the power supply. It is thus possible to eliminate the drawback wherein the cursor moves freely without operating the pointing stick and software malfunctions.

If, as shown in FIG. 5, a capacitor 103 is connected between the power supply VCC and ground as a noise killer, a difference in potential between the power supply VCC and ground can be stabilized by capacitive coupling of the capacitor 103 and thus an adverse effect due to the noise in the power supply can be decreased further.

The interface between the keyboard controller 26 and IPS controller 28 will now be described with reference to FIG. 6.

As shown in FIG. 6, the IPS controller 28 includes a PS interface connected to the pointing stick 31 and a mouse interface connected to the external mouse 32 to control the pointing stick 31 and external mouse 32 through these interfaces. The external mouse 32 is connected to a mouse interface of the IPS controller 28 via a PS/2 mouse connector provided on the computer body.

A selector 50 including a bidirectional analog switch circuit is connected between the IPS controller 28 and the PS/2 mouse interface of the Keyboard controller 26. The selector 50 has a first port A connected to the PS/2 mouse connector provided on the computer body and a second port B connected to the KBC interface of the IPS controller 28, and one of the first and second ports A and B is connected to the PS/2 mouse interface of the keyboard controller 26.

The switching of the selector 50 is controlled by a switch signal S1 generated in accordance with a switch flag set in a predetermined I/O register. The switch signal S1 is also supplied to an enable input terminal of the IPS controller 28 in order to associate the switching control of the selector 50 with the enable/disable control of the IPS controller 28.

As illustrated in FIG. 7, when the switch signal S1 is "0", the port B is connected to the PS/2 mouse interface of the keyboard controller 26, and the IPS controller 28 is enabled.

What can be used in this case is a mouse supported by the IPS controller 28 as well as the pointing stick 31.

If a mouse other than one supported by the IPS controller 28 is employed, the switch signal S1 is changed from "0" to "1" by setting the switch flag. The port A is then connected to the PS/2 mouse interface of the keyboard controller 26, and the IPS controller 28 is disabled.

Since, in this case, the external mouse can be connected directly to the keyboard controller 26 but not through the IPS controller 28, various types of mouse can be employed without using the IPS controller 28. If the port A is selected by the selector, the IPS controller 28 is disabled. Therefore, there occurs no problems such as a collision between signals from the IPS controller 28 and keyboard controller 26 on the PS/2 mouse connector.

An applied example of the interface shown in FIG. 6 will now be described with reference to FIGS. 8 and 9.

Figures 8, 9:
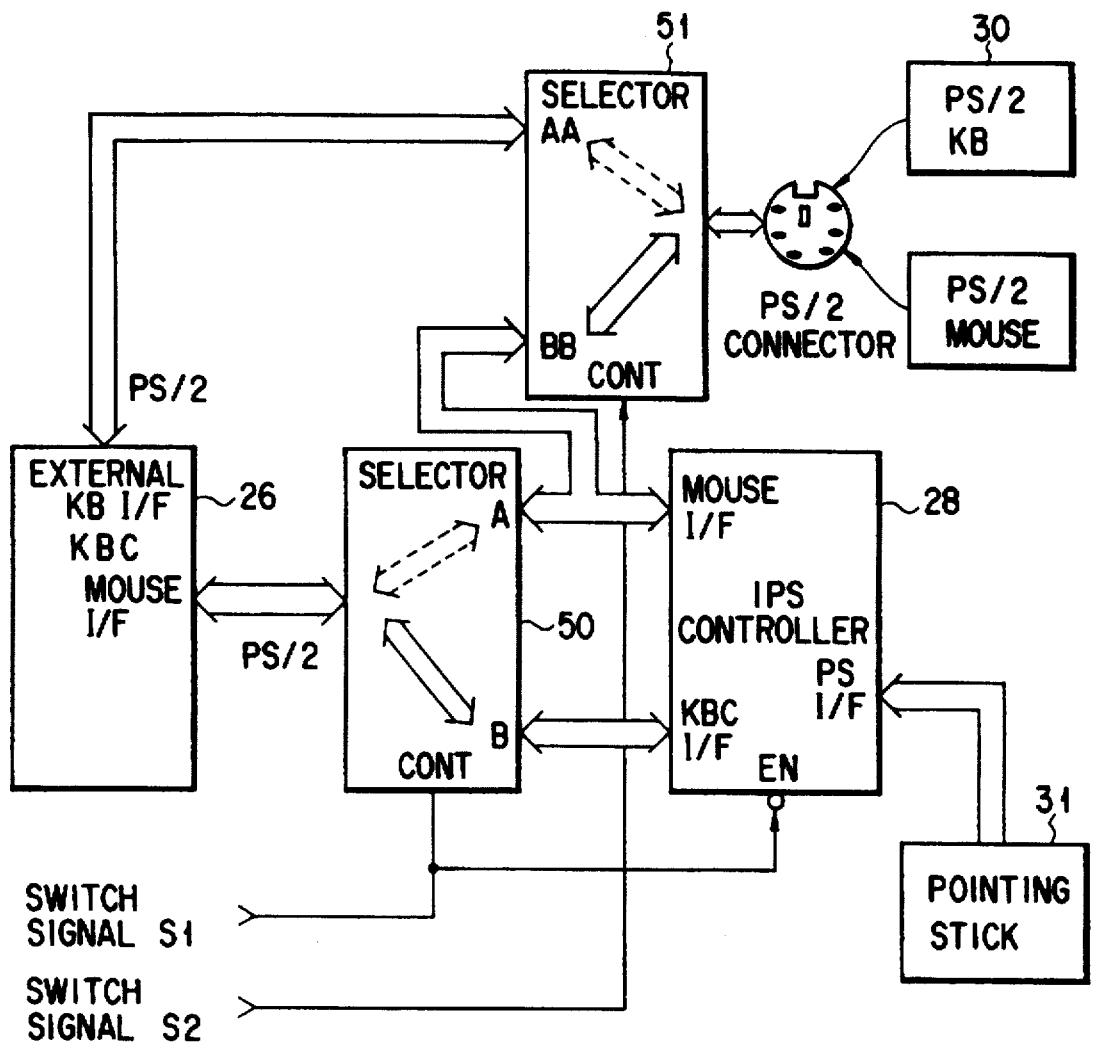
FIG. 8 is a view explaining another interface between the keyboard controller and IPS controller in the personal computer shown in FIG. 1.
FIG. 9 is a view explaining an operation of a selector used in the connecting configuration shown in FIG. 8.

In FIG. 8, a second selector 51 including a bidirectional analog switch circuit is added to the configuration shown in FIG. 6. The second selector 51 has a port BB to which the port A of the selector 50 and the mouse interface of the IPS controller 28 are connected, and a port AA to which the external keyboard interface of the keyboard controller 26 is connected. The PS/2 connector provided on the computer body is connected to either the port AA or the port BB. The switching of the selector 51 is controlled by a switch signal S2 generated in accordance with a second switch flag set in a predetermined I/O register.

As shown in FIG. 9, when the switch signal S2 is "0", the PS/2 mouse connector is connected to the port BB; therefore, the configuration of FIG. 8 is the same as that of FIG. 6 and the external mouse 32 can be employed.

When the switch signal S2 is "1", the PS/2 mouse connector is connected to the port AA. Thus, the PS/2 mouse connector is connected directly to the external keyboard interface of the keyboard controller 26. If the PS/2 keyboard 30 is connected to the PS/2 mouse connector, the keyboard 30 can be employed.

Consequently, in the configuration shown in FIG. 8, both the external keyboard and external mouse can be supported by the single PS/2 connector.

As described above, according to the present invention, the mounting efficiency of the system board and the operating reliability of the pointing stick can be enhanced by improving the interface between the pointing stick and system board. Moreover, various types of external mouse can be used by the improvement in connection between the keyboard controller and control IC.

What is claimed is:

1. A computer comprising:

a keyboard unit including a plurality of keys and a pointing device arranged between the keys;

a first flat cable leading out of said keyboard unit and comprising scan signal lines and return signal lines for controlling a key matrix of said keyboard unit;

a second flat cable comprised of control signal lines of the pointing device and leading out from said pointing device; and a common connector mounted on a system board for connecting the first and second flat cables in a lateral arrangement, and having terminals arranged in a line, whose number corresponds to a total sum of the control signal lines, scan signal lines and return signal lines.

* * * * *